United States Patent
Hallman et al.

(10) Patent No.: US 6,505,844 B2
(45) Date of Patent: Jan. 14, 2003

(54) DOOR TRANSPORTING AND SUPPORT SYSTEM

(76) Inventors: David Hallman, 9626 Deschutes Rd., Palo Cedro, CA (US) 96073; Neil Hallman, 9626 Deschutes Rd., Palo Cedro, CA (US) 96073

( * ) Notice: Subject to any disclaimer, the term of this patent is extended or adjusted under 35 U.S.C. 154(b) by 0 days.

(21) Appl. No.: 09/785,952

(22) Filed: Feb. 16, 2001

(65) Prior Publication Data

US 2002/0113390 A1 Aug. 22, 2002

(51) Int. Cl.⁷ ............................................. B62B 1/00
(52) U.S. Cl. ..................... 280/79.7; 280/43; 280/35; 280/143; 269/17; 118/500
(58) Field of Search ................... 280/79.7, 35, 43.17, 280/43.2, 43.22, 143, 147, 148, 47.24, 146; 16/42 R, 42 T, 32, 19; 296/905; 414/10, 11, 428, 743; 269/905, 17; 118/500; 248/129, 151, 150, 165

(56) References Cited

U.S. PATENT DOCUMENTS

| | | | |
|---|---|---|---|
| 586,440 A | * 7/1897 | Kernek | 280/146 |
| 2,471,096 A | * 5/1949 | Colorigh | 280/146 |
| 3,642,251 A | 2/1972 | Niederholtmeyer | 254/131 |
| 3,871,054 A | 3/1975 | Schaefer | 29/267 |
| 4,010,931 A | 3/1977 | Wheeler | 254/131 |
| 4,043,536 A | 8/1977 | Almond | |
| 4,098,442 A | 7/1978 | Moore | 224/45 P |
| 4,213,624 A | * 7/1980 | Sanders | 280/43.12 |
| 4,695,067 A | 9/1987 | Willey | |
| 4,712,819 A | 12/1987 | Pope | |
| 5,584,635 A | 12/1996 | Stapelmann | |
| 5,927,731 A | * 7/1999 | Clarke | 280/79.7 |
| 6,022,008 A | 2/2000 | Bachman | |
| 6,079,696 A | 6/2000 | Bette | |
| 6,231,034 B1 | * 5/2001 | Walker et al. | 269/17 |
| 6,338,758 B1 | * 1/2002 | Curran | 118/500 |

* cited by examiner

Primary Examiner—Brian L. Johnson
Assistant Examiner—G Klebe

(57) ABSTRACT

A door transporting and support system for allowing an individual to easily transport and install a door within a doorjamb. The door transporting and support system includes a base having a door receiving channel, a pair of first arms extending from the base, a pair of second arms extending from the base, a plurality of caster wheels attached to the arms each by an adjustable threaded shaft, a plurality of support rods extending from the arms, and a plurality of support members removably attached to the support rods in a vertical manner. The base includes a pair of parallel side walls that define the channel. The height, angle and position of a door retained within the base are determined by the position of each threaded shaft of the caster wheels.

18 Claims, 8 Drawing Sheets

DOOR TRANSPORTING AND SUPPORT SYSTEM

BACKGROUND OF THE INVENTION

1. Field of the Invention

The present invention relates generally to door installation devices and more specifically it relates to a door transporting and support system for allowing an individual to easily transport and install a door within a doorjamb.

2. Description of the Prior Art

Door support devices have been in use for years for assisting individuals in the installation of doors within doorjambs. Conventional door support devices typically are comprised of a lower lip attached to a frame that engages the lower edge of the door which requires the individual to "balance" the door adjacent to the doorjamb. An example of a manufactured door installation device is the DOOR JAK manufactured by Hardnox, LLC and described in U.S. Pat. No. 5,762,348.

Conventional door installation devices are not suitable for quick, efficient and accurate installation of doors within a doorjamb. Conventional door installation devices typically requiring the attaching or securing of the door within the installation device which requires time to attach and remove. Another problem with conventional installation devices is that they do not allow for the minute and accurate adjustment of the angle of the door with respect to the doorjamb to compensate for imperfect doorjambs and doors.

Examples of patented door support devices which are illustrative of such prior art include U.S. Pat. No. 3,871,054 to Schaefer; U.S. Pat. No. 4,695,067 to Willey; U.S. Pat. No. 4,043,536 to Almond; U.S. Pat. No. 4,010,931 to Wheeler; U.S. Pat. No. 5,584,635 to Stapelmann; U.S. Pat. No. 6,022,008 to Bachman; U.S. Pat. No. 6,079,696 to Bette; U.S. Pat. No. 4,712,819 to Pope; U.S. Pat. No. 4,098,442 to Moore; U.S. Pat. No. 3,642,251 to Niederholtmeyer.

While these devices may be suitable for the particular purpose to which they address, they are not as suitable for allowing an individual to easily transport and install a door within a doorjamb. Conventional door installation devices do not allow for minute adjustment of the position of the door relative to a doorjamb to allow for accurate and simple installation of the door within the doorjamb.

In these respects, the door transporting and support system according to the present invention substantially departs from the conventional concepts and designs of the prior art, and in so doing provides an apparatus primarily developed for the purpose of allowing an individual to easily transport and install a door within a doorjamb.

SUMMARY OF THE INVENTION

In view of the foregoing disadvantages inherent in the known types of door support devices now present in the prior art, the present invention provides a new door transporting and support system construction wherein the same can be utilized for allowing an individual to easily transport and install a door within a doorjamb.

The general purpose of the present invention, which will be described subsequently in greater detail, is to provide a new door transporting and support system that has many of the advantages of the door support devices mentioned heretofore and many novel features that result in a new door transporting and support system which is not anticipated, rendered obvious, suggested, or even implied by any of the prior art door support and installation devices, either alone or in any combination thereof.

To attain this, the present invention generally comprises a base having a door receiving channel, a pair of first arms extending from the base, a pair of second arms extending from the base, a plurality of caster wheels attached to the arms each by an adjustable threaded shaft, a plurality of support rods extending from the arms, and a plurality of support members removably attached to the support rods in a vertical manner. The base includes a pair of parallel side walls that define the channel. The height, angle and position of a door retained within the base is determined by the position of each threaded shaft of the caster wheels.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a door transporting and support system that will overcome the shortcomings of the prior art devices.

A second object is to provide a door transporting and support system for allowing an individual to easily transport and install a door within a doorjamb.

Another object is to provide a door transporting and support system that does not require the attaching of the door to the device during installation of the door.

An additional object is to provide a door transporting and support system that does not require more than one person to install a door within a door jamb thereby saving time and money.

A further object is to provide a door transporting and support system that allows for easy transportation of a door.

Another object is to provide a door transporting and support system that fits various sizes of doors.

A further object is to provide a door transporting and support system that allows for easy minute adjustment of the angle and position of the door with respect to a doorjamb allowing for the accurate installation of doors within a doorjamb.

Another object is to provide a door transporting and support system that allows for easy positioning and installation of doors within doorjambs.

An additional object is to provide a door transporting and support system that is stable.

A further object is to provide a door transporting and support system that does not damage doors during transporting or installation.

Another object is to provide a door transporting and support system that is collapsible into a compact storage position.

An additional object is to provide a door transporting and support system that reduces door installation time and saves money for an installer.

Another object is to provide a door transporting and support system that reduces injuries to a door installer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
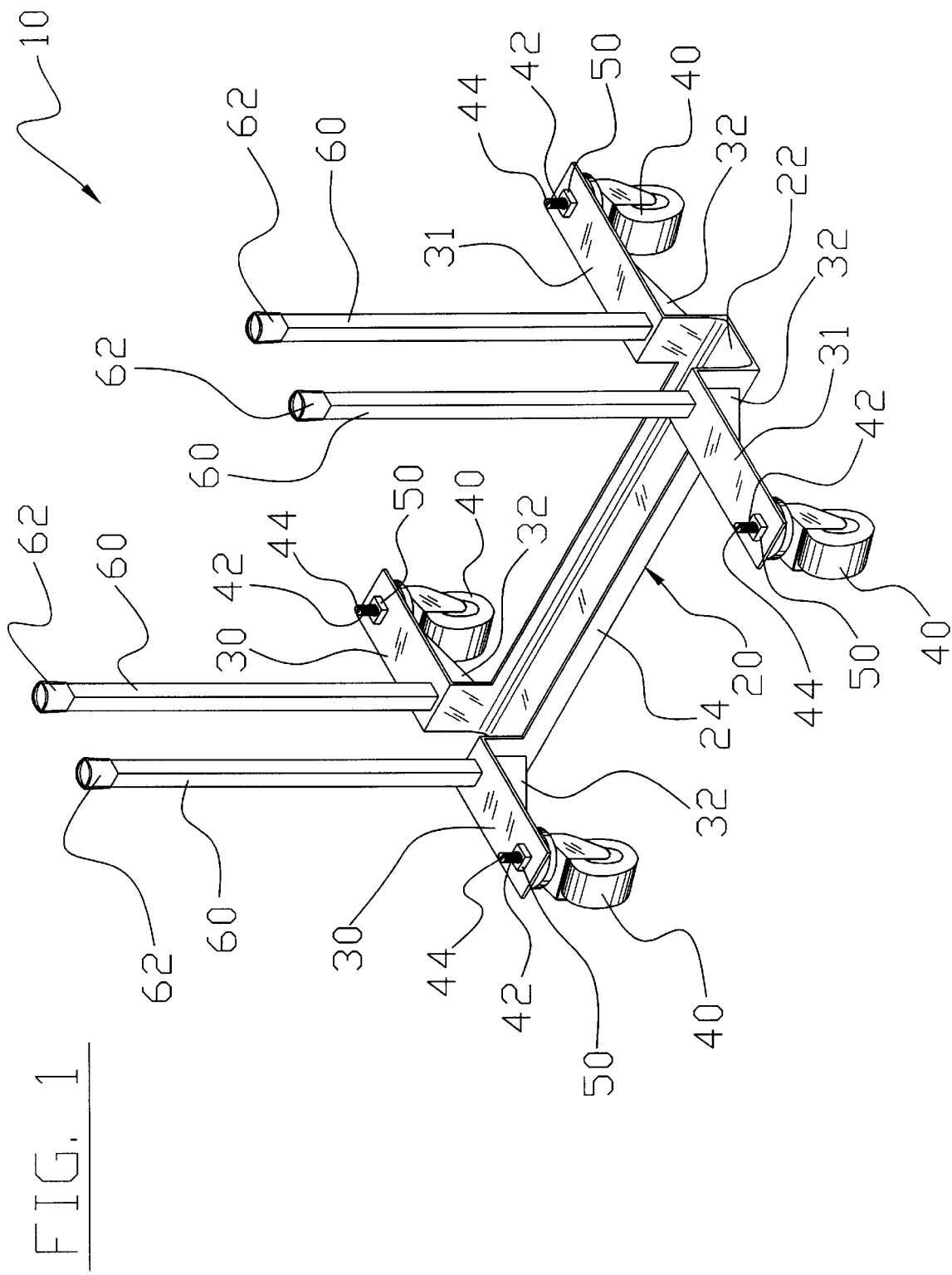
FIG. 1 is an upper perspective view of the present invention.
Figure 2:
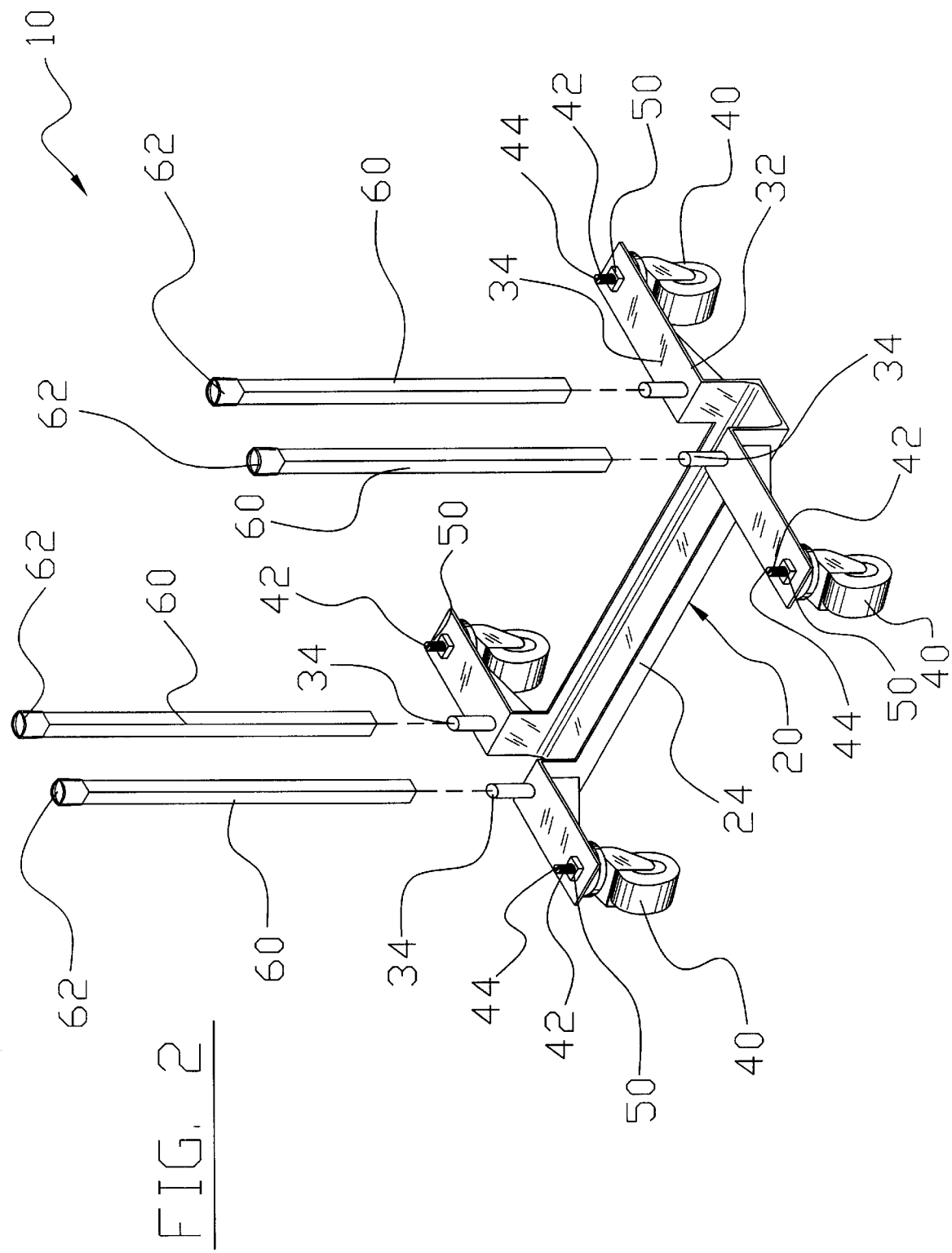
FIG. 2 is an exploded upper perspective view of the present invention.

Turning now descriptively to the drawings, in which similar reference characters denote similar elements throughout the several views, FIGS. 1 through 8 illustrate a door transporting and support system 10, which comprises a base 20 having a door 12 receiving channel 22, a pair of first arms 30 extending from the base 20, a pair of second arms 31 extending from the base 20, a plurality of caster wheels 40 attached to the arms 30, 31 each by an adjustable threaded shaft 42, a plurality of support rods 34 extending from the arms 30, 31, and a plurality of support members 60 removably attached to the support rods 34 in a vertical manner. The base 20 includes a pair of parallel side walls 24 that define the channel 22. The height, angle and position of a door 12 retained within the base 20 are determined by the position of each threaded shaft 42 of the caster wheels 40.

Figure 3:
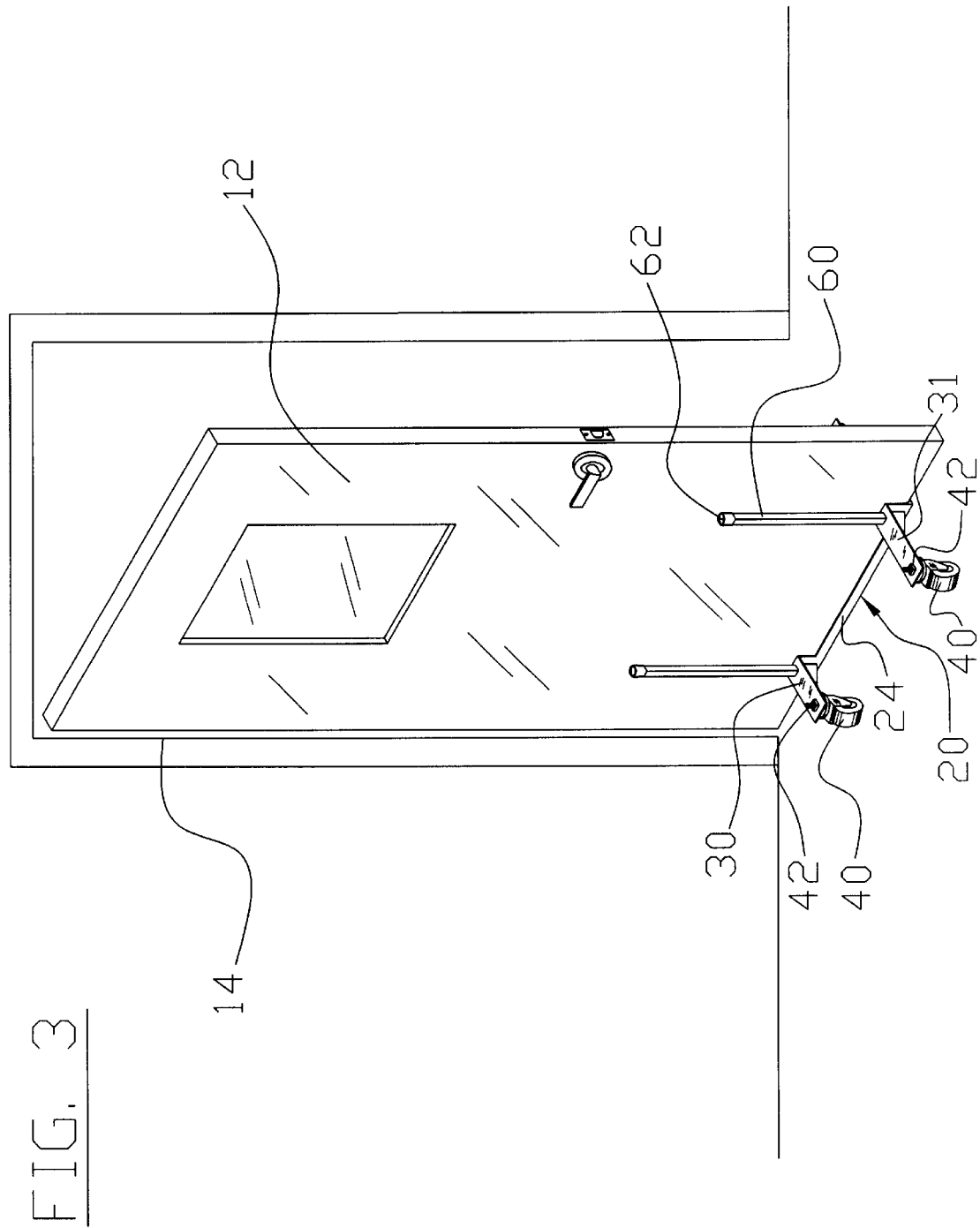
FIG. 3 is an upper perspective view of the present invention supporting a door adjacent a doorjamb.
Figure 4:
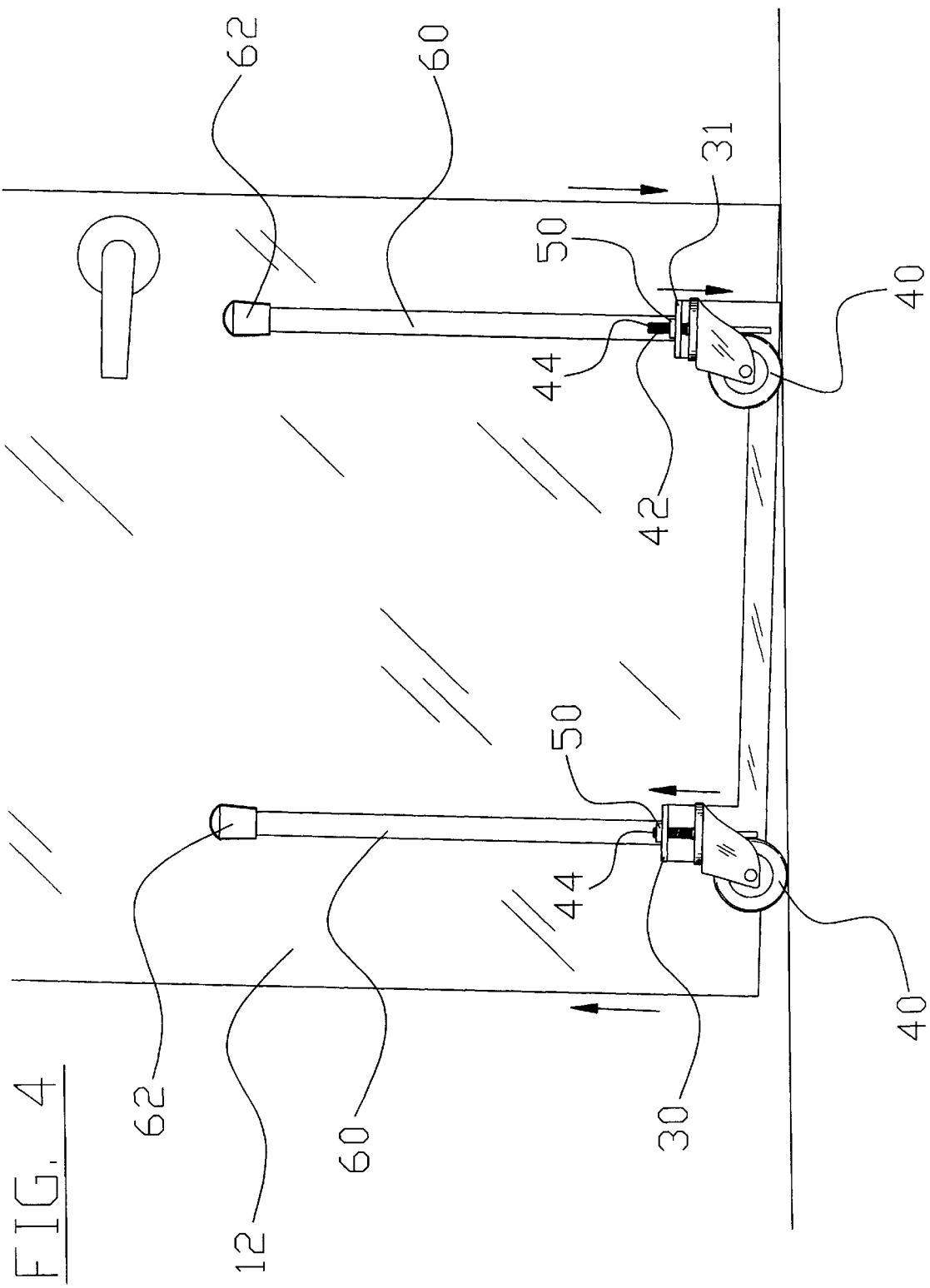
FIG. 4 is a side view of the present invention supporting a door in an included position.

As shown in FIGS. 1, 2, 3, 4, 5 and 8 of the drawings, the base 20 is comprised of an elongate structure. The length of the base 20 is preferably shorter than the width of a door 12 to reduce interference during transporting and installation as illustrated in FIGS. 3 and 4 of the drawings. The base 20 preferably has a low profile that is able to position the lower edge of the door 12 close to a floor surface if required.

Figure 7:
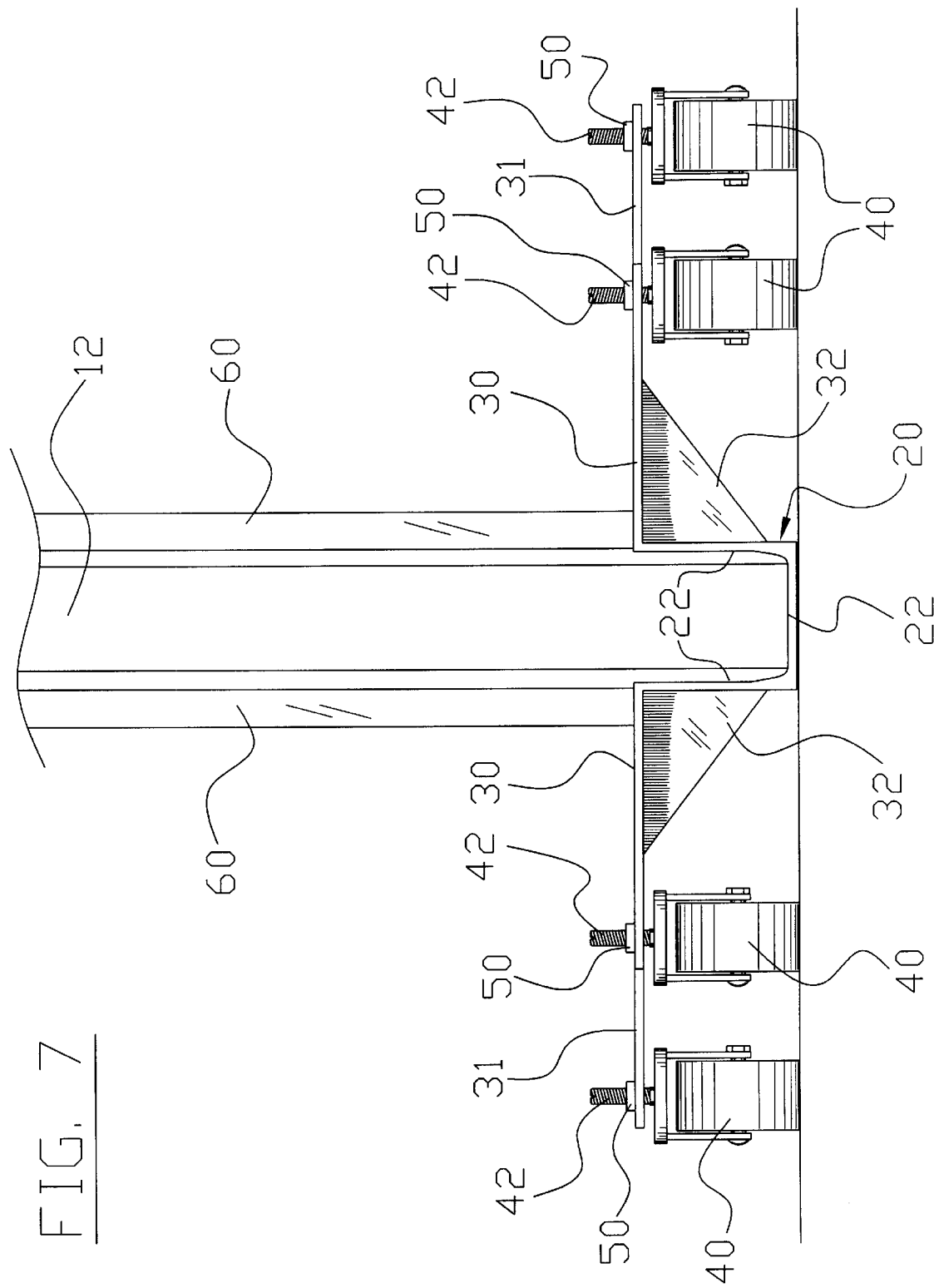
FIG. 7 is an end view of the present invention supporting a door.
Figure 8:
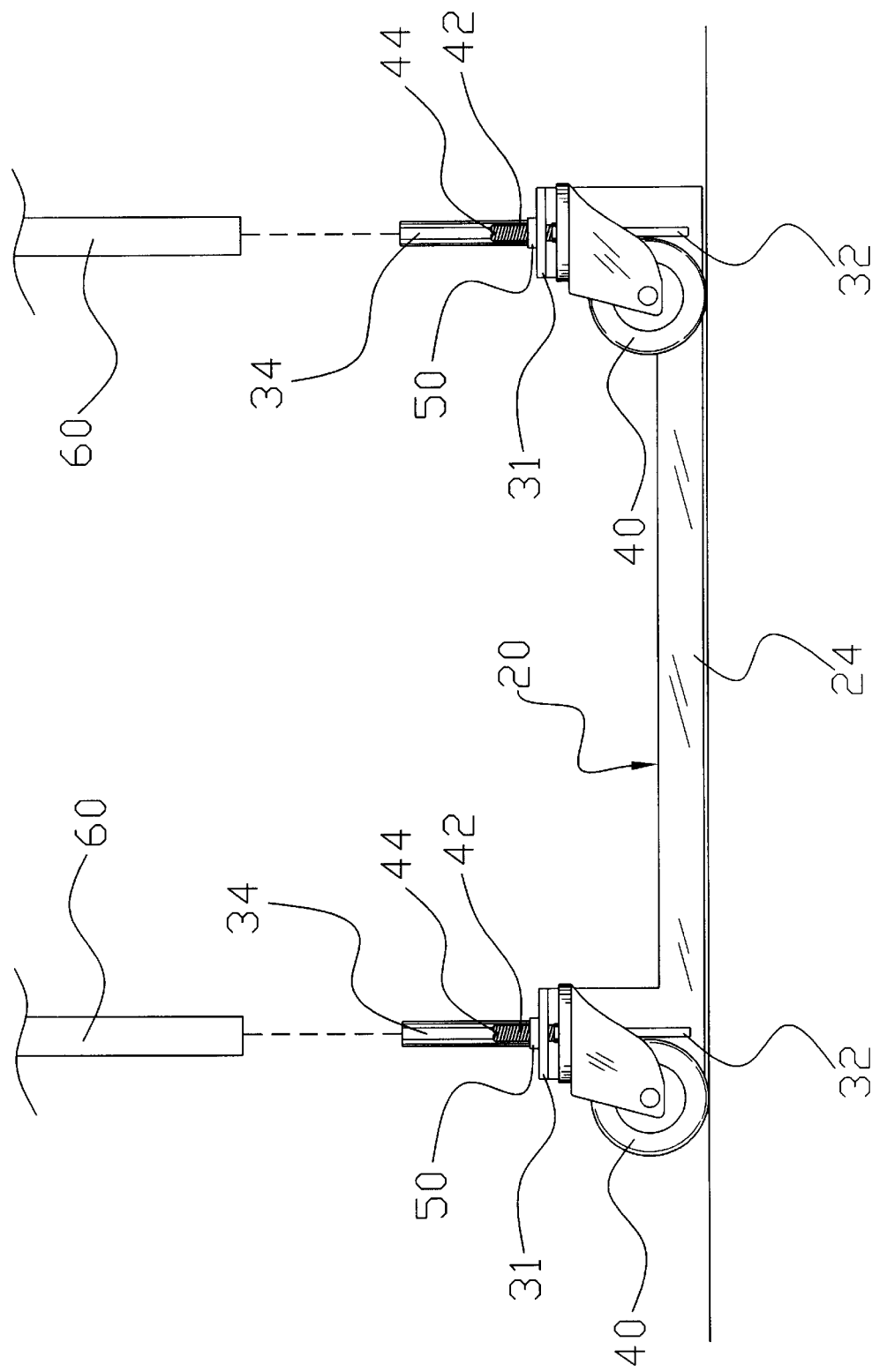
FIG. 8 is an exploded side view of the present invention.

As best illustrated in FIGS. 1, 2, 5, 6 and 7 of the drawings, the base 20 includes a channel 22 defined by a pair of opposing side walls 24 forming a U-shaped cross sectional shape for receiving the lower portion of the door 12. The side walls 24 may have various heights and widths as can be appreciated. The distance between the pair of side walls 24 defining the channel 22 is sufficient to receive the thickness of the door 12 as shown in FIG. 7 of the drawings.

Figure 5:
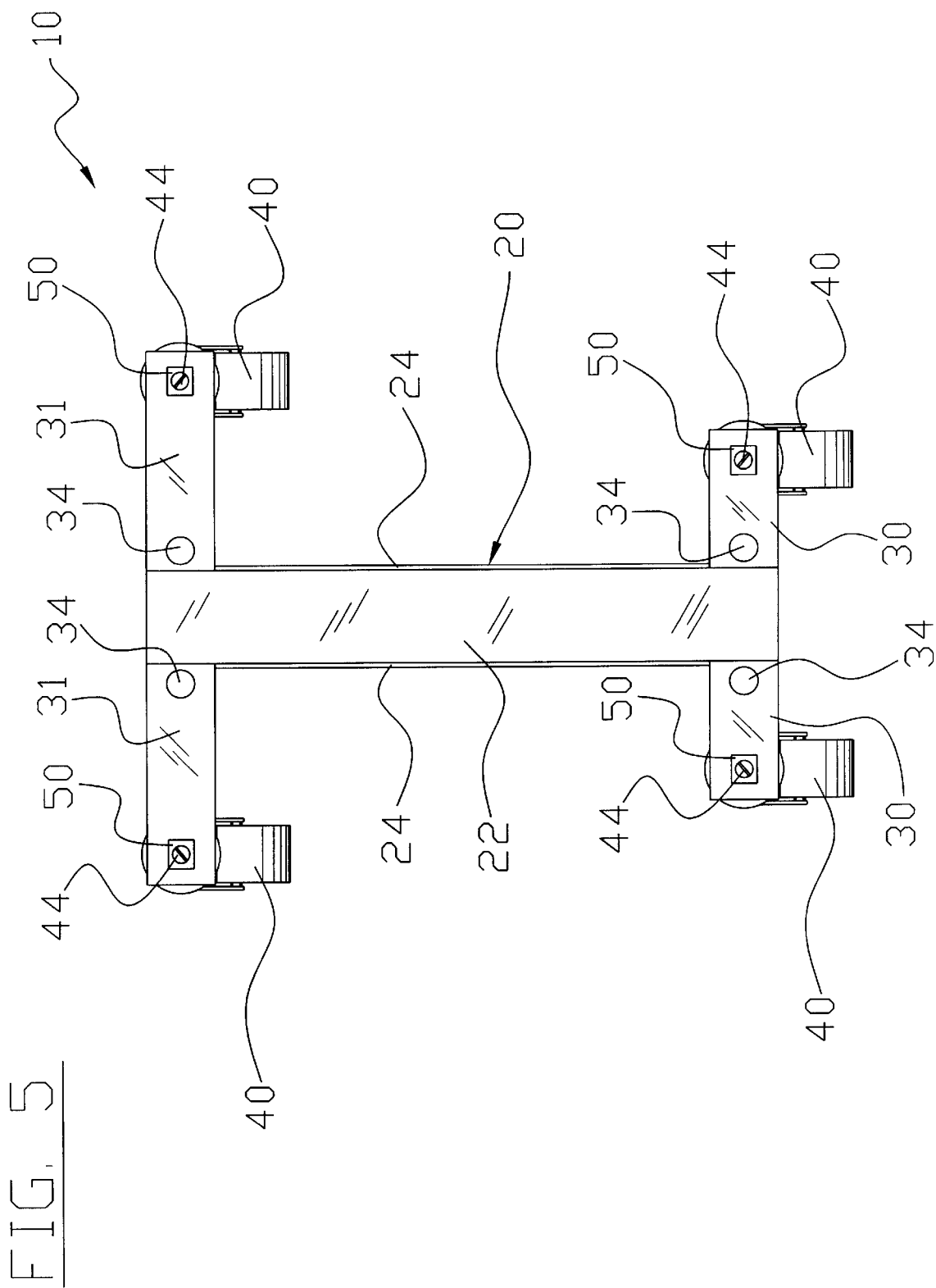
FIG. 5 is a top view of the present invention illustrating the channel within the base.
Figure 6:
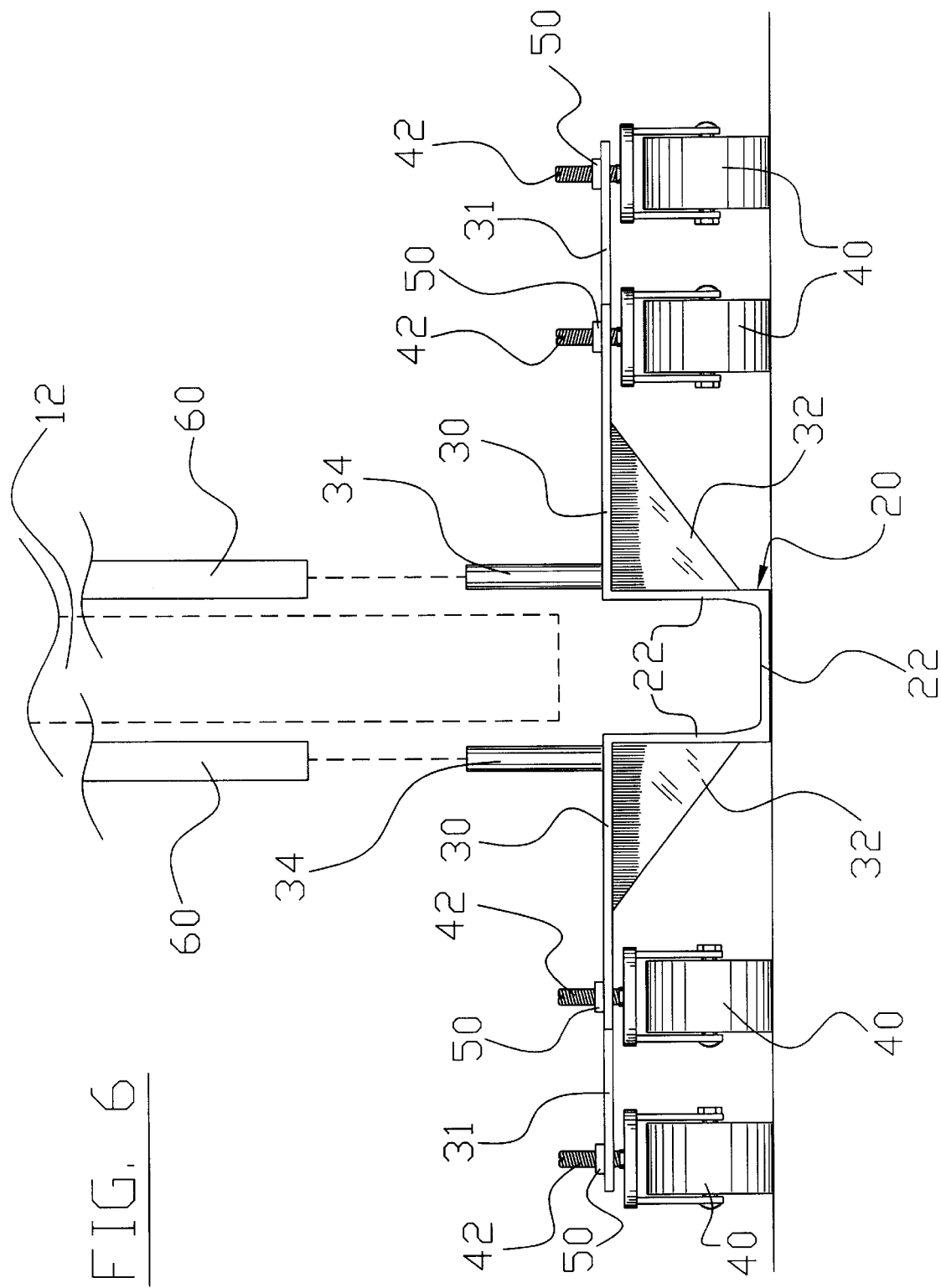
FIG. 6 is an exploded end view of the present invention.

As shown in FIGS. 1 through 8 of the drawings, a pair of first arms 30 are attached to an end of the base 20 extending away from one another. As further shown in FIGS. 1 through 8 of the drawings, a pair of second arms 31 are attached to an end of the base 20 opposite of the first arms 30 extending away from one another. The first arms 30 and second arms 31 are preferably parallel to one another as best illustrated in FIG. 5 of the drawings.

As further shown in FIG. 5 of the drawings, the second arms 31 are preferably longer than the first arms 30 for providing increased stability to the base 20 supporting the door 12 while the first arms 30 are shorter for providing increased accessibility during the installation of the door 12. The arms 30, 31 each preferably include a brace 32 extending from one of the side walls 24 toward the outer portion of the arms 30, 31 to assist in supporting the weight of the door 12 when positioned upon the base 20.

As shown in FIGS. 1 through 8 of the drawings, a plurality of caster wheels 40 are attached to the arms 30, 31. The arms 30, 31 each include a threaded shaft 42 that is threadably and adjustably attached to the respective arms 30, 31. The arms 30, 31 may have an interiorly threaded aperture within and/or interiorly threaded members 50 secured to the arms 30, 31 as illustrated in FIGS. 1 through 8 of the drawings. The threaded members 50 are attached to the arms 30, 31 via conventional attaching means. The caster wheels 40 are preferably positioned toward the outer portions of the arms 30, 31 to provide increased stability to the base 20 and door 12.

Each threaded shaft 42 includes an upper engaging end 44 that may be engaged by a tool such as a screwdriver or wrench for facilitating rotation of the threaded shaft 42. By rotating each individual threaded shaft 42, the user is able to achieve the desired height, angle and position of the door 12. It can be appreciated that additional arms and caster wheels 40 may be attached to the base 20 for providing increased stability.

As shown in FIGS. 2, 5, 6 and 8 of the drawings a plurality of support rods 34 are attached to the arms 30, 31 in a vertical manner. The support rods 34 may also be attached directly to the base 20 as can be appreciated. The support rods 34 are preferably positioned adjacent the side walls 24 defining the channel 22.

A plurality of support members 60 have a tubular lower end are removably positionable about the support rods 34 as illustrated in FIGS. 1, 3, 4 and 7 of the drawings. The support members 60 extend vertically a finite distance to provide additional support to the door 12 during transportation and installation.

Each of the support members 60 preferably includes a protective cover 62 about the upper end thereof to protect the door 12 from damage or marking from the support members 60. The protective cover 62 may be constructed of various types of materials commonly utilized to protect objects such as but not limited to rubber or plastic. The support members 60 may be removed when the system 10 is not in use for providing a compact storage structure. It can be appreciated that the support members 60 may also be permanently attached to the base 20 and/or the arms 30, 31.

In use, the user positions the support members 60 upon the support rods 34 as illustrated in FIGS. 1 through 4 of the drawings. The user then positions the door 12 within the channel 22 of the base 20 between the plurality of support members 60 as shown in FIGS. 3, 4, 6 and 7 of the drawings. The inner part of the door 12 to be attached to the doorjamb 14 is preferably positioned with respect to the first arms 30 as illustrated in FIGS. 3 and 4 of the drawings. The user manipulates the position of the door 12 and system 10 until the inner edge of the door 12 is adjacent the doorjamb 14 to be attached to as shown in FIG. 3 of the drawings. The user then views the relative position of the hinges to be attached between the door 12 and the doorjamb 14 and thereafter manipulates each threaded shaft 42 accordingly to achieve the desired height, angle and position of the door 12 with respect to the doorjamb 14. Once the door 12 is properly aligned with respect to the doorjamb 14 by manipulating each threaded shaft 42, the user then attached the door 12 to the doorjamb 14 while the door 12 is still supported upon the base 20. Once the door 12 is properly attached to the doorjamb 14, the user then lowers the height of the base 20 and thereafter slides the base 20 outwardly from the door 12. When finished utilizing the system 10, the user simply removes support members 60 from the support rods 34 to provide for a compact storage position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A door transporting and support system, comprising:
   a base for removably supporting a lower portion of a door;
   a plurality of arms attached to and extending from opposing sides of said base;
   a plurality of support members attached to said plurality of arms extending upwardly substantially parallel to one another; and
   a plurality of caster wheels adjustably attached to said plurality of arms, wherein each of said plurality of caster wheels is threadably attached to said plurality of arms by a threaded shaft.

2. The door transporting and support system of claim 1, wherein said threaded shaft includes an engaging end.

3. The door transporting and support system of claim 2, wherein said engaging end is engagable by a tool.

4. The door transporting and support system of claim 1, wherein said plurality of caster wheels are positioned near a distal portion of said plurality of arms.

5. The door transporting and support system of claim 1, wherein said plurality of arms are comprised of a pair of first arms attached to an end of said base and a pair of second arms attached to an opposing end of said base.

6. The door transporting and support system of claim 5, wherein said pair of first arms are shorter in length than said pair of second arms.

7. The door transporting and support system of claim 6, wherein said pair of first arms and said pair of second arms are parallel to one another.

8. The door transporting and support system of claim 1, wherein said base includes a channel having a pair of opposing side walls, wherein said channel is formed for receiving said lower portion of said door.

9. A door transporting and support system, comprising:
   a base for removably supporting a lower portion of a door;
   a plurality of arms attached to and extending from opposing sides of said base;
   a plurality of support rods attached to said plurality of arms and a plurality of support members having a tubular lower portion removably positionable about said plurality of support rods; and
   a plurality of caster wheels adjustably attached to said plurality of arms, wherein each of said plurality of caster wheels is threadably attached to said plurality of arms by a threaded shaft.

10. A door transporting and support system, comprising:
    a base for removably supporting a lower portion of a door;
    a plurality of arms attached to and extending from opposing sides of said base;
    a plurality of support members attached to said plurality of arms extending upwardly substantially parallel to one another;
    a plurality of interiorly threaded members attached to said plurality of arms; and
    a plurality of caster wheels adjustably attached to said plurality of arms, wherein each of said plurality of caster wheels is threadably attached to said plurality of interiorly threaded members by a threaded shaft.

11. The door transporting and support system of claim 10, wherein said threaded shaft includes an engaging end.

12. The door transporting and support system of claim 11, wherein said engaging end is engagable by a tool.

13. The door transporting and support system of claim 10, wherein said plurality of caster wheels are positioned near a distal portion of said plurality of arms.

14. The door transporting and support system of claim 13, wherein said plurality of arms are comprised of a pair of first arms attached to an end of said base and a pair of second arms attached to an opposing end of said base.

15. The door transporting and support system of claim 14, wherein said pair of first arms are shorter in length than said pair of second arms.

16. The door transporting and support system of claim 15, wherein said pair of first arms and said pair of second arms are parallel to one another.

17. The door transporting and support system of claim 10, wherein said base includes a channel having a pair of opposing side walls, wherein said channel is formed for receiving said lower portion of said door.

18. The door transporting and support system of claim 10, including a plurality of support rods attached to said plurality of arms for receiving said plurality of support members having a tubular lower portion.

* * * * *